(12) United States Patent
Gapontsev et al.

(10) Patent No.: US 9,306,364 B2
(45) Date of Patent: Apr. 5, 2016

(54) ULTRA HIGH POWER SINGLE MODE FIBER LASER SYSTEM

(71) Applicant: IPG PHOTONICS CORPORATION, Oxford, MA (US)

(72) Inventors: Valentin Gapontsev, Worcester, MA (US); Igor Samartsev, Westborough, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 0 days.

(21) Appl. No.: 14/464,337

(22) Filed: Aug. 20, 2014

(65) Prior Publication Data

US 2015/0055210 A1 Feb. 26, 2015

(51) Int. Cl.
*H01S 3/00* (2006.01)
*H01S 3/094* (2006.01)
*H01S 3/067* (2006.01)
*H01S 3/16* (2006.01)

(52) U.S. Cl.
CPC ....... *H01S 3/094042* (2013.01); *H01S 3/06745* (2013.01); *H01S 3/06754* (2013.01); *H01S 3/094011* (2013.01); *H01S 3/094069* (2013.01); *H01S 3/1618* (2013.01)

(58) Field of Classification Search
CPC . H01S 3/067; H01S 3/06708; H01S 3/06745; H01S 3/08018; H01S 3/094069; H01S 3/23; H01S 3/2308; H01S 3/2316

USPC ........... 359/341.1, 341.3, 337; 372/6, 19, 70, 372/38.06

See application file for complete search history.

(56) References Cited

U.S. PATENT DOCUMENTS

| 8,089,689 B1* | 1/2012 | Savage-Leuchs | 359/341.1 |
| 2004/0233941 A1* | 11/2004 | Fajardo et al. | 372/6 |
| 2012/0127563 A1* | 5/2012 | Farmer et al. | 359/341.3 |

* cited by examiner

*Primary Examiner* — Mark Hellner
(74) *Attorney, Agent, or Firm* — Timothy J. King, Esq.; Yuri Kateshov, Esq.

(57) ABSTRACT

An ultra-high power fiber laser system includes a single-piece fiber booster configured with fiber and straight short rod fiber portions which have in common a core configured with a numerical aperture≥0.1. The rod fiber portion has a length≤a few tens of centimeters and has a frustoconical cross-section expanding from the uniformly configured fiber portion. The core extending along the fiber portion supports a single mode (SM) or very low number of HOMs, whereas the large-diameter end of the frustoconical core portion supports a fundamental mode and high order multiple modes. The disclosed booster is energized by a pump source configured to emit pump light with such a density that while amplification of the fundamental mode continues in the central area of the core, a peripheral non-overlapped area of the core is bleached. The disclosed booster emits signal light in substantially a fundamental mode.

20 Claims, 2 Drawing Sheets

ULTRA HIGH POWER SINGLE MODE FIBER LASER SYSTEM

BACKGROUND OF THE DISCLOSURE

1. Field of the Disclosure

The disclosure relates to ultra-high power fiber laser systems emitting a MW-level peak and kW-level average power output substantially in a fundamental mode. Particularly, the disclosure relates to a single mode fiber laser system with a booster stage configured with as an active multimode fiber which has a few centimeter-long output core region end-pumped in a counter-propagating direction.

2. Prior Art

The dramatic rise in output power from rare-earth-doped fiber sources over the past decade, via the use of double clad fibers led to a range of fiber-laser system with outstanding performance in terms of output power, beam quality, overall efficiency, and wavelength flexibility. Yet the power scaling of modern high power fiber laser systems is far from satisfying ever increasing industry demands.

Currently, advances in this field are primarily constrained by limitations in maximum extractable energy, and the onset of nonlinear effects. Saturation energy of the gain medium is a key parameter for determining how much energy can be stored in an amplifier, and is given by $$E_{sat} = \frac{h v_s A_{eff}}{(\sigma_{es} + \sigma_{as})\Gamma_s} \quad (1)$$

whereas, as are the emission and absorption cross section at the signal wavelength, $h\, \nu_s$ is signal energy at frequency $\nu_s$, $A_{eff}$ is area of the active doped region and s is signal overlap with the active region.

The deleterious nonlinear effects and particularly stimulated Brillouin scattering (SBS) and stimulated Raman scattering (SRS) rob power from the signal and can cause catastrophic damage. As one of ordinary skill in the fiber laser arts knows, mitigation is possible by increasing the modal area and decreasing the fiber length. Because a larger core occupies a larger fraction of the overall fiber cross-section and therefore has higher pump absorption, the optimum fiber length varies inversely with $A_{eff}$. Thus, increasing the core area naturally results in shorter length.

However, the core cannot be limitlessly increased. For single-mode operation, as the core diameter increases, the refractive index difference between the core and cladding, n, must decrease and, after a certain threshold, become bend sensitive. And when n is fixed at a minimum, further increase in core diameter results in multimode operation. While this is permissible, core size is then constrained by unavoidable but undesirable energy transfer among modes. The mode coupling efficiency between modes in a multimode fiber is given by $$\eta \sim (\lambda^2 k^2)/(\Delta n^{2p} \text{eff}) \quad (2)$$

where k is the perturbation amplitude due to index and microbead fluctuations, neff is the difference in effective indices between different modes, and p is a fitting parameter (with value>0) to account for mechanical perturbations on a fiber. Thus, large neff is desirable for low mode coupling. Unfortunately, as $A_{eff}$ increases, neff decreases and at a certain point the mode coupling cannot be avoided.

An additional problem with large $A_{eff}$ designs in all applications of high power lasers and amplifiers involves spatially transforming and focusing the device output. This is best achieved with Gaussian beams. Thus, an important metric for high power devices is a measure of the departure from a perfect Gaussian spatial profile $M^2$ ($M^2 = 1$ is a perfectly Gaussian mode).

Current preferred laser designs concentrate on means to provide operation in a fundamental mode with a low $M^2$, even though the fiber may guide several modes. One disclosed means to achieve this is to design an amplifying system including multiple separate fibers which are fused to one another. In particular, the system is configured with a uniformly dimensioned SM passive fiber guiding SM signal light to a taper configured to adiabatically expand the MFD of the SM to a size substantially matching the size of a fundamental mode of uniformly dimensioned MM amplifying fiber which is fused to the output of the taper. Because of multiple fiber components, splice losses may be unforgivably high. Furthermore, manufacturing the multicomponent system, as discussed above, is time inefficient and thus costly. Still further, low threshold of NLEs and bending losses may still be unacceptable.

Recently, the fiber laser industry has turned to crystal fiber rods typically used in output stages of amplifier chains to address the scalability of fiber amplifiers. Based on airclad technology, a crystal fiber rod includes a clad structure surrounding a large diameter core which is capable of supporting substantially only a fundamental mode. The core is configured with a very small numerical aperture ("NA") which typically does not exceed about 0.02.

In fiber rods, like in any double-clad structure, pump light is coupled into an inner cladding, which has an adequate NA. With a clad pumping configuration and low dopant concentration, typical lengths of fiber rods are about one meter and longer. Such fiber lengths have a few undesirable consequences, as explained below.

An open-end structure of fiber rods may pose certain problems. Typically, launching signal light throughout air gaps can be realized by micro-optics. The latter complicates the entire configuration making it cumbersome and cost-ineffective. The presence of air in the gaps or holes lowers thermal conductivity. In particular, it slows dissipation of heat, which, in turn, may damage the rod itself and be environmentally hazardous.

As one of ordinary skill knows, the premise underlying an efficient high power, single mode fiber laser system, is rather simple: maximally enlarged mode field diameter of the fundamental mode and the shortest possible MM doped core. These desired characteristics of a high power fiber laser system can be easily understood by the presence of nonlinear optical effects ("NLE"), which are considered critical limitations for achieving MW power peak levels and high quality laser beam laser outputs.

In general, NLEs, which in fact include diverse physical phenomena, can be presented as $$NLE = \int_0^l \frac{P(z)}{A} dz,$$

wherein l is a the fiber length, P is the power (in pulsed systems the peak power), A is the in-core guided mode field area, z is the position of power along the fiber.

However, increasing the core doped region in MM waveguides leads to increasing the number of guided modes higher than the fundamental mode and, as a consequence, to degrading the beam quality. This can be mitigated by the core's greatly reduced numerical aperture ("NA") as has been implemented in the above mentioned fiber rods. The small NA critically limits the amount of pump light coupleable into the core leaving clad pumping as the only viable option.

As to the known pumping arrangements, whether the pump light is coupled into the fiber rod's cladding in either of forward- or back-propagation direction in accordance with the end-pumping scheme or by using a side pumping scheme, the length of a fiber rod necessary for the desired absorption is greater than 50 centimeters. Such a length, even if the above mentioned core/clad area ratio is high, inevitably leads to a low NLE threshold.

Turning now to power sources, the brightness of MM pump laser diodes, which in light of absence of high power single mode ("SM") laser diodes are necessary, may not be adequate. If the available brightness of the pump is somewhat acceptable, the need for improved absorption of pump light, which leads to decreased fiber lengths, can be realized by the increased fiber core/cladding area ratio in double clad fibers, as featured in fiber rods. However, the increased ratio may reduce the brightness acceptance in the fiber cladding.

Summarizing the above, the design of high power fiber systems faces difficult challenges because of the following factors: nonlinear effects in fibers in general and fiber rods in particular, loss of fundamental mode power to high order modes ("HOM"); pump brightness and, of course, excessive heat generation. Although each factor limits power scaling independently, in the booster stage (the final gain stage), they are also interrelated, i.e., reducing one may increase the effects of another.

A need therefore exists for an ultra-high power fiber laser system substantially overcoming the above-discussed disadvantages of the known systems.

SUMMARY OF THE DISCLOSURE

This need is satisfied by the disclosed ultra-high power SM fiber laser system. The disclosed system is capable of emitting a MW-level peak power and kWs of average power in substantially a fundamental mode.

In accordance with one aspect, the disclosed system includes a booster amplifier configured with at least two differently shaped parts: a flexible, uniformly-dimensioned input fiber and a frustoconical fiber rod expanding away from the input fiber. The amplifier includes a phosphate core doped with a high concentration of ions of rare earth elements, which varies between about 1000 and about 5000 ppm across the entire cross-section of the core. The input portion of the core extending along the input fiber part is configured to guide only a fundamental mode ("FM") or low number of high order modes ("HOM"). The output portion of the core expanding along the fiber rod has an output end capable of supporting multiple modes whose amplification, as explained below, is substantially suppressed.

One of the disclosed structural aspects includes a maximum possible overlap between the areas of FM and core, respectively. In particular, the area of the FM ("Afm") exceeds $0.65^2$ of the core area ("Ac") along the entire length of the core. Such a large overlap provides a considerably greater amplification of the FM mode than that of any HOM.

A further aspect of the disclosure includes pumping high power MM pump light into the large-diameter core end of the rod fiber. The pump light is characterized by a numerical aperture NAp lower than that of the core NAc which is substantially equal to or greater than 0.1. The counter-propagating direction, specified above NA of pump light and large mode field diameter of the FM provide favorable conditions for the effective absorption of pump light along a very small axial length of the tapered core part. The latter does not exceed about 30 cm, but preferably is about 10 cm long. With such a limited length, a threshold for NLEs is extremely high and, therefore, the power sealing can be considerably improved up to MW-level peak powers in the single fundamental mode or very few HOMs.

A further aspect of the disclosure relates to a core border region which is not overlapped by the fundamental mode. Since the entire cross-section of the core is doped with rare earth ions or emitting activators, a particular concern includes limiting the amplification of spontaneous emission and/or HOMs in the border core region, which is accomplished as explained immediately below.

The disclosed pump source is structured to output pump light having a power density which is much higher than a density required to bleach absorption of light emitters in the border core region. In other words, the pump light is coupled into the output region of the core in the counter propagating direction is able to invert the population of rare earth ions in the core area overlapped by the fundamental mode of the signal, but it is insufficient to provide adequate population inversion in the non-overlapped region. As a consequence, the fundamental mode occupying the central region of the core is amplified more than HOMs and/or spontaneous emission.

BRIEF DESCRIPTION OF THE DRAWINGS

The above and other aspects, features and advantages of the disclosed structure will become more readily apparent from the following specific description along with the drawings, in which.

SPECIFIC DESCRIPTION

Figure 1:
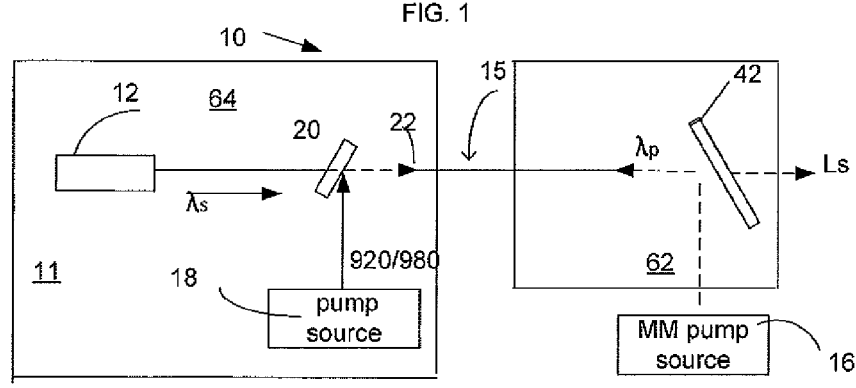
FIG. 1 is a highly diagrammatic view of the disclosed ultra-high power fiber laser system

Reference will now be made in detail to embodiments of the invention. Wherever possible, same or similar numerals are used in the drawings and the description to refer to the same or like parts or steps. The drawings are in simplified form and are not to precise scale. Unless specifically noted, it is intended that the words and phrases in the specification and claims be given the ordinary and accustomed meaning to those of ordinary skill in the fiber laser arts. The word "couple" and similar terms do not necessarily denote direct and immediate connections, but also include mechanical optical connections through free space or intermediate elements.

FIG. 1 illustrates a highly diagrammatic view of an ultra-high power laser system 10 configured with a main console 11, laser head assembly 62 spaced from main console 11 and unconfined booster 15 which extends between the console and laser head assembly over free space and is enclosed within a protective jacket 62 (FIG. 3) that terminates within the laser head. The system 10 may be configured with a master oscillator/power amplifier ("MOPA") including, among others, an oscillator/seed 12 and booster amplifier 15. One of ordinary skill in the art can easily realize that additional intermediary amplifying cascades between the seed and booster can be easily utilized.

The seed 12 is operative to emit a SM signal light at a wavelength λs in a wide range of wavelengths such as from about 960 nm to about 2000 nm depending on ions of rare earth elements doped in fiber components of any given system. For example, ytterbium ("Yb"), Erbium ("Er"), Neodymium ("Nd"), Thulium ("Tm") are given here only as an example. With Yb ions being most widely used in industrial and military laser applications requiring a high power the following discussion is concentrated on this particular type of dopants but still provides one of ordinary skill in the fiber laser art with a universal teaching of all possible rare earth elements. The ion concentration varies between about 1000 ppm and about 5000 ppm depending on a particular type of light emitter. The booster 15 is preferably configured with a polarization maintaining ("PM") phosphate fiber, but regular, non-PM phosphate active fibers can be used as well within the scope of the present of disclosure.

Figure 2:
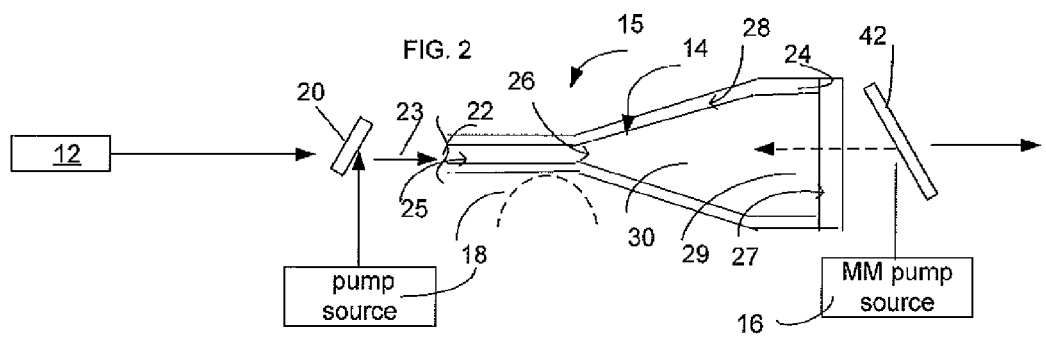
FIG. 2 is a diagrammatic view of one of the embodiments of the system of FIG. 1.

Referring to FIG. 2, booster amplifier 15 is configured with a monolithic fiber-to-fiber-rod gain medium including a fiber portion 25 and a fiber rod portion 24 which is configured with a length ranging from a few centimeters to a few tens of centimeters. For example, fiber rod portion 24 may vary between about 10 cm long to about 30 cm. Alternatively, portions 25 and 24, respectively, may be configured as separate parts spliced together. The fiber rod portion 24 has a large-diameter uniformly dimensioned configuration supporting multiple modes. A generally frustoconical intermediate portion is configured with a small diameter downstream end 22, receiving the SM or low high order mode signal light from fiber portion 25 at the desired wavelength λs, and a large diameter output end matching that of the output of fiber rod portion 24. A MM pump source 16 emits pump light λp which is coupled into the core output uniformly dimensioned end in a counter-propagating direction. On the opposite, input end of booster 15, another pump source 18 emits MM pump light coupled into input end 22 of fiber portion 25 in a co-propagating direction.

The gain of the laser medium is determined by the product of pump light intensity in the gain medium and interaction length of the input laser radiation with that medium, e.g. the absorption length. Due to extremely high pump powers reaching up to a kW level and a high threshold for NLEs, system 10 is operative to emit, for example, about a 5 kW average power output or up to MW levels peak-power output in substantially a fundamental mode through large-diameter core end of booster 15, as disclosed immediately below.

The system 10 preferably operates in a pulsed regime, but certainly can be utilized in a continuous wave ("CW") operation. The booster 15 thus includes a core 26 which is doped, for example, with Yb ions and a cladding 28 surrounding core 26. The input region extending from input end 22 of core 26 is configured with a uniform diameter and dimensioned to guide either only a single fundamental mode or very low number of HOMs excited in response to SM signal light from seed 12 which is coupled into core 26. This is done by aligning the cores of respective booster 15 and fiber 23, which may be arranged within the main console or outside thereof in a delivery cable 60 (FIG. 3) which enclose booster 15. Additionally, input end 22 may be configured to have a mode field diameter ("MFD") of a fundamental mode ("FM") substantially match an MFD of SM signal light emitted from seed 12 and delivered along a SM fiber 23.

The input region of core 26 runs into a mode transition region 30 adiabatically expanding along the fiber rod portion 14 towards its output end supporting multiple modes. An optional downstream uniformly configured region 29 completes the structure of fiber rod portion 14. A quartz block 27 having a cylindrical or conical cross-section is configured to lower a high power density of the output signal. The booster 15 and pump source 16 are configured to suppress amplification of HOMs and/or spontaneous emission along output region 24 as disclosed immediately below.

Figure 3:
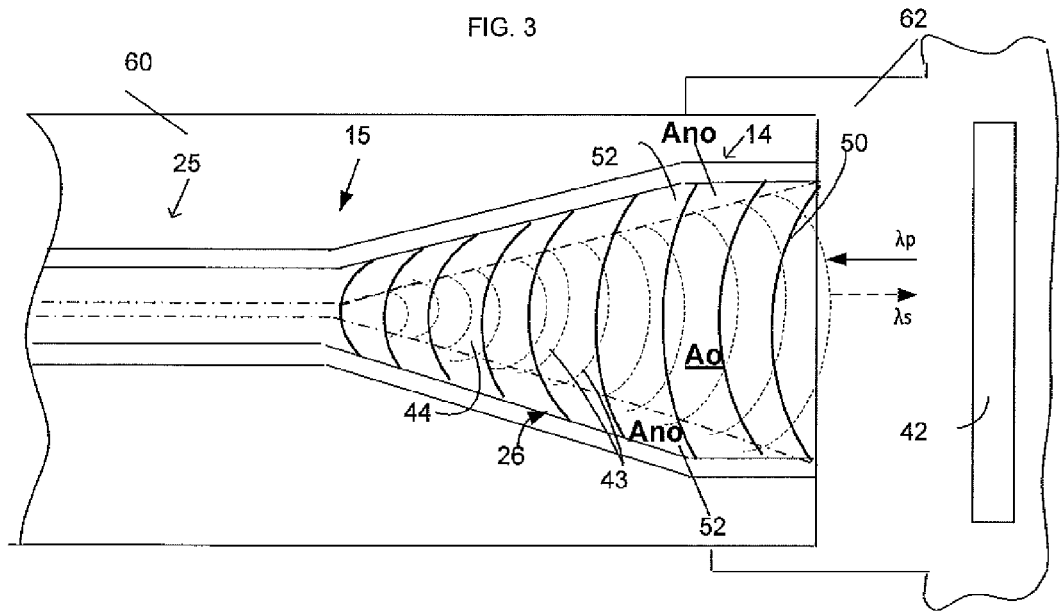
FIG. 3 is a diagrammatic view of the disclosed structure configured explaining the mechanism of suppressing HOMs.

FIG. 3 illustrates the disclosed mechanism for suppressing the amplification of HOMs and/or undesirable spontaneous emission along fiber rod portion 14 of booster 15. The booster's core 26 is doped across its entire cross-section with one or combination of more rare-earth elements and configured with a NA substantially equal to or higher than 0.1. Furthermore, the entire length of core 26 is structured to have about $0.65^2$ of its central area Ao overlapped by FM 43, which thus leaves a small peripheral area Ano 52 of core 26—a zone where HOMs and/or spontaneous emission can be amplified—not overlapped by the FM.

This amplification in peripheral area Ano 52 is however largely suppressed by configuring pump source 16 such that it emits pump light 50 with a numerical aperture NALp at most matching a numerical aperture NALc of core 26. As a consequence, the FM 43 is enclosed within the pump light which thus has a size which is at least as large as that of the fundamental mode along an entire length of core 26. In other words, the power density of the pump light is much higher than a power density required bleaching non-overlapped core area Ano. Hence while the Ano area of core 26 is characterized by substantially equal number of ions at ground and high energy levels, respectively, i.e., further injection of pumping light does not result in light amplification. At the same time, in overlapped area Ao of core 26, the number of ions on a high energy level is continuously higher than that on the ground level, and amplification of the FM continues resulting eventually in a much higher amplification of the FM than that of any HOM and SE in the non-overlapped area Ano of core 26.

The opening angle of the cone of rod fiber portion 14 is controllably selected to provide decoupling of at least some unabsorbed pump light Lp before it enters fiber portion 25 that may be surrounded by a heat sink. The pump light is coupled into booster 15 at different angles. The rays with a relatively large angle leak outside relatively easily. The rays with smaller angles, i.e., rays propagating almost parallel to the axis of booster 15, when incident on the cladding, reflect therefrom at a larger angle which is sufficient to provide decoupling of the reflected rays after they subsequently reach the surface.

Figure 4:
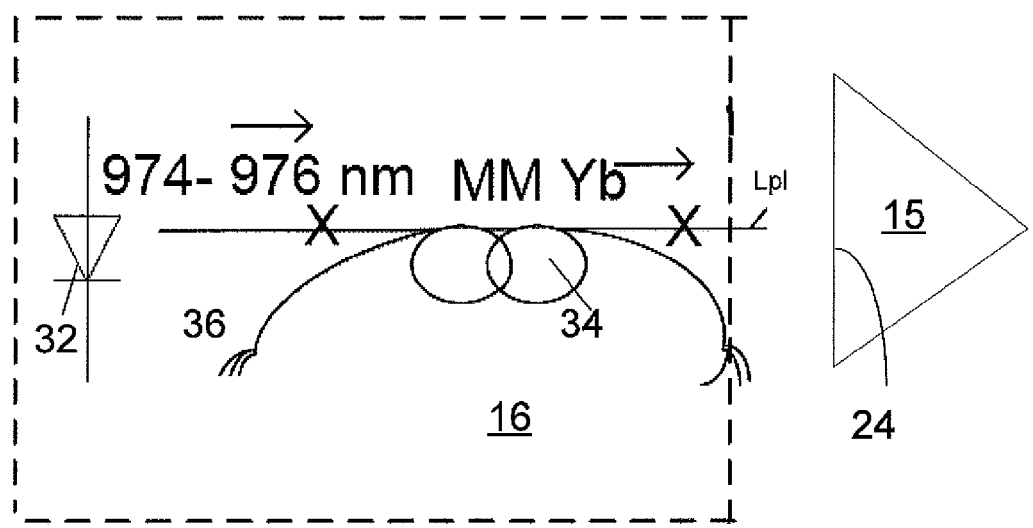
FIG. 4 is a diagrammatic view of exemplary high power MM fiber pump source utilized in the system of FIG. 1.

Referring to FIGS. 3 and 4, pump source 16 is configured as a MM fiber laser system and includes at least one or more combined seeds 32 generating a seed light, for example, in a 980 nm range, and a MM wavelength converter 34 receiving and amplifying pump light so as to output a high power, high brightness pump light coupled into booster 15. The pump light is coupled into large core end 24 of booster 15 as disclosed above interference to FIG. 3.

The wavelength converter 34 includes an active fiber which has a multimode core doped with Yb ions and side pumped by sub-pump system 36 which includes a plurality of combined semiconductor laser diodes. The latter generate sub-pump light, coupled into converter 34 at a sub-pump wavelength λsp, is so selected that λp−λsp<0/1λ·sp, wherein λp is a pump output wavelength. The closeness of the wavelengths contributes to a high quantum efficiency that, in turn, translates into low-heat related losses. As disclosed, wavelength converter 34 is operative to convert sub-pump emission at the λsp wavelength to the pump wavelength λ·p also in a 1 micron range as close to the signal light wavelength λs as possible.

For example, pump source 16 may be configured to generate the pump light at about 1016 nm whereas the signal light is emitted at about 1030 nm.

The pump seed 32, for example, is configured as a single or multiple combined powerful pigtailed MM laser diodes or fiber-based seeds generating a smooth, spike-less signal light in a 980 nm wavelength range with a noise level corresponding to a root-mean-square (r.m.s.) value of at least about 0.1 r.m.s. The diode also has a NA which ranges between about 0.1 and 0.13. The light from pump seed 32 may have an output power that varies between tens and hundreds of watts. A particular wavelength Aped of the output of pump source 16 is selected to pump converter 34 at a wavelength closest to the peak of absorption of the latter.

The MM Yb-doped active fiber of wavelength converter 34 may have a double clad or regular configuration and a core diameter which may vary, for example, within about 50 to 150 microns (or greater) range. The Yb-doped fiber of converter 34 is further configured with a NA varying between about 0.05 and 0.1.

The output power of pump light from wavelength converter 34 can be very high and depends on the number of UP semiconductor laser diodes 36 combined in a sub-pump assembly which, for example, side pumping converter 34 and, of course, the number thereof. Thus the power of pump light P–N×Pld, wherein N is number of HP laser diodes and Pld-power of each individual diode. Of course, the output power of pump light P also depends on the power of the seed light, which may be added to the combined power of HP laser diodes. The pump light may be emitted, for example, at a 920 nm wavelength and propagate both along with and counter to the propagation of the signal light. The number of laser diodes may include of up 90 diodes combined together. Each diode may output, for example, a 100 watt pump light. Accordingly, pump source 16 can output a multi kW pump light at the desired pump wavelength. Note that while the sub-pump assembly is shown to side-pump wavelength converter 14, an end pumping configuration including a plurality of laser diodes 36 can be readily realized by one of ordinary skills in the art.

The high power levels of the pump light Pp1 dramatically contribute to the improved brightness ("B") of the pump light compared to the seed light. The brightness B can be generally equal to Po/BPP, wherein BPP is a beam parameter product which, in turn, can be determined as ½Dc×NA, wherein Dc-core diameter and NA is a numerical aperture. Since the NA is practically the same or smaller than the NA of the signal light, the brightness of the pump output can be at least 10 times greater than that of the most powerful MM combiner of the known art provided the output power is substantially uniform.

The concentration of Yb dopants in the core is advantageously relatively low. In accordance with this disclosure, preferably, the concentration of Yb ions varies between 50 and 100 ppm. But this range may be expanded to about a 10-200 ppm range.

Alternatively, pump source 16 may be configured with multiple high power MM laser diodes. However, the brightness of thus configured pump cannot be comparable to that of the above-disclosed fiber laser configuration. The coupling of the pump light into output end 24 of core 26 may be realized by using a centrally-slotted mirror or lens 42 (FIG. 2).

Returning to FIGS. 1 and 2, the FM, exited in input region 22 of core 26 upon coupling of the SM signal light, is additionally amplified by a pump source 18 emitting pump light at, for example, 920 nm wavelength. One of possible pumping scheme may include a plurality of diodes using a wavelength division multiplexer ("WDM") 20 which also receives the signal light. The output signal from WDM 20 thus carries two different frequencies both coupled into input end 22 of core 26. Alternatively, a side bi-directional pumping technique can be utilized as shown by dash lines. In accordance with this scheme, pump light emitted by a plurality of laser diodes is coupled into cladding 28 in co- and counter-propagating directions along the input region of booster 14.

Having described at least one of the preferred embodiments of the present invention with reference to the accompanying drawings, it is to be understood that the invention is not limited to those precise embodiments. For example, the disclosed system can operate in a CW regime. Various changes, modifications, and adaptations including different wavelengths, fiber parameters and rare-earth dopants may be effected therein by one skilled in the art without departing from the scope or spirit of the invention as disclosed above.

The invention claimed is:

1. An ultra-high power single mode ("SM") fiber laser system comprising:
   a monolithic fiber to fiber-rod optical amplifier including elongated input fiber and output fiber rod portions, the amplifier being structured with a core and a cladding surrounding the core between opposite ends of the amplifier, the core including:
   a flexible, uniformly dimensioned input core region extending along a length of the input fiber portion and configured to waveguide a SM in a propagating direction, and
   an output core region extending from the input core region along a length of the fiber rod portion towards an output end of the core, which is capable of supporting fundamental and high order modes with a mode area of the fundamental mode ("FM") overlapping a central zone of a cross-section area of the core, the fiber rod portion being configured with a length between about 10 cm and about 30 cm, and a numerical aperture of at least about 0.1; and
   an ultra-bright multimode pump source operative to emit pump light having a numerical aperture at most equal to that of the output end of the core and coupled into the output core end in a counter-propagating direction, a power density of the pump light being much higher than a density required to bleach a zone of the core not overlapped by the FM, wherein the amplifier emits an output in the SM with an average output power exceeding about 5 kW or a peak power reaching a GW level.

2. The ultra-high power fiber laser system of claim 1 further comprising:
   a coreless silica glass rod spliced to the output end of the amplifier and having a cylindrical cross-section or generally conical cross-section,
   a main console;
   a laser head spaced from the main console; and
   a protective jacket enclosing at least a fiber rod portion of the amplifier and extending over free space between the main console and laser head.

3. The ultra-high power fiber laser system of claim 1, wherein the output core region is configured with a frusto-conically-shaped intermediate part expanding towards the output end of the core.

4. The ultra-high power fiber laser system of claim 3, wherein the output core region further has a cylindrically shaped part extending from the frustoconically-shaped part and including the output core end.

5. The ultra-high power fiber laser system of claim 1, wherein the pump light source is configured with at least one pump seed source generating a low-noise pump light signal a wavelength λp;
- a plurality of high power ("HP") semiconductor laser diodes combined together to radiate sub-pump emission at a sub-pump wavelength λsp; and
- an Yb-doped multimode ("MM") fiber wavelength converter of the sub-pump emission at the sub-pump wavelength λsp to the pump signal at the wavelength λ·p, wherein the pump signal emitted by the wavelength converter has:
- a noise level substantially identical to those of the low-noise signal light,
- a brightness ("B") substantially equal to n×B, wherein n is a number HP semiconductor laser diodes, and B is brightness of each HP laser diode, and
- an output power ("Po") substantially equal to nPd, wherein Pd is a power of each HP laser diode, and n is the number thereof.

6. The ultra-high power fiber laser of claim 2 further comprising
- a seed enclosed within the main console and operative to emit the SM signal light coupled into the input core region,
- a wavelength division multiplexer ("WDM") located between the seed and input core end,
- an additional pump source emitting MM pump light coupled into the WDM which is configured to combine the signal and additional pump light coupled into the input core end.

7. The ultra-high power fiber laser system of claim 6 further comprising an additional pump source operative to bi-directionally side pump the input end region.

8. The ultra-high power fiber laser system of claim 6 wherein the seed emits the signal light at a wavelength varying between about 960 nm and about 2 μm.

9. The ultra-high power fiber laser system of claim 1, wherein the FM overlaps at least 0.652 of the cross-section area of the core along an entire length of the core.

10. The ultra-high power fiber laser system of claim 1 wherein the booster includes a polarization maintaining active phosphate fiber doped with light emitters, a concentration of the doped light emitters varying between about 1000 ppm and about 5000 ppm.

11. A booster stage comprising:
- a booster including a fiber portion and fiber rod portion and configured with a core which extends between opposite ends of the booster and at least one cladding which surrounds the core, the core including:
- a uniformly structured input core region which supports a single mode or low number of high order modes guided in a propagating direction along the fiber portion, and a uniformly configured output core region extending along the fiber rod portion and having an outer diameter which is larger than a diameter of the input core region, the output core region being dimensioned to support fundamental and high order modes, and
- an intermediate core region bridging the input and output portions while having a diameter which expands from the small diameter of the input core region to the large diameter of the output region; and
- an ultra-high power multimode pump source operative to emit pump light having a numerical aperture at most equal to that of the output core region, the pump light being coupled into output core region in a counter-propagating direction so as to enclose the fundamental mode along an entire length of the core, wherein the amplifier emits an output in substantially the fundamental mode with an average output power exceeding about 5 kW or a peak power reaching a MW level.

12. The booster stage of claim 11, wherein the fiber rod portion is configured with a length varying between about 10 cm and about 30 cm, and with a numerical aperture of at least 0.1, the fundamental mode being equal to at least $0.65^2$ of a core cross-sectional area and extending along a central zone of the core, a power density of the pump light being much higher than a density required to bleach a zone of the core not overlapped by the FM.

13. The booster stage of claim 11 further comprising a coreless silica glass rod, which is spliced to the output end of the booster and has a cylindrical cross-section or generally conical cross-section, and an unconfined flexible jacket enclosing the booster.

14. The booster stage of claim 11, wherein the core of the booster is doped with phosphate and rare earth light emitters with the latter being doped in a concentration of up to 5000 ppm.

15. The booster stage of claim 11, wherein the pump light source is configured with:
- at least one pump seed source generating a low-noise pump light signal a wavelength λcp;
- a plurality of high power ("HP") semiconductor laser diodes combined together to radiate sub-pump emission at a sub-pump wavelength λ·sp; and
- an Yb-doped multimode ("MM") fiber wavelength converter of the sub-pump emission at the sub-pump wavelength/csp to the pump signal at the wavelength λ·cp, wherein the pump signal emitted by the wavelength converter has:
- a noise level substantially identical to those of the low-noise signal light,
- a brightness ("B") substantially equal to n×B, wherein n is a number HP semiconductor laser diodes, and B is brightness of each HP laser diode, and
- an output power ("Po") substantially equal to nPd, wherein Pd is a power of each HP laser diode, and n is the number thereof.

16. The booster stage of claim 11 further comprising an additional pump source emitting MM pump light coupled into an upstream end of the input core region.

17. The booster stage of claim 11, wherein the output of the booster is emitted at a wavelength between about 960 nm and about 2000 nm.

18. The booster stage of claim 11, wherein the booster has a monolithic body or multi-part body in which the fiber and fiber rod portions are spliced to one another.

19. A system for amplifying light, comprising:
- an optical fiber amplifier having an elongated uniformly structured fiber portion and a fiber rod portion, the amplifier having a core and at least one cladding surrounding the core, the core including:
- a uniformly structured input core region which supports a single mode or low number of high order modes guided in a propagating direction along the fiber portion,
- a uniformly structured output core region configured with a diameter which is larger than that of the input core region, and
- an intermediary core region expanding towards the output core region which is dimensioned to support fundamental and high order modes, a mode area of the fundamental mode overlapping a central sub-area of the core cross-sectional area; and an ultra-high power multimode pump source operative to emit pump light with a numerical aperture at most equal to that of the core of the output core region, the pump light being coupled into the output core region in a counter-propagating direction so that the fundamental mode is enclosed within the pump light having a size at least as large as the fundamental mode along an entire length of the core, wherein the gain medium emits an output in substantially the fundamental mode with an average output power exceeding about 5 kW or a peak power reaching a MW level.

20. The fiber amplifier of claim 19, wherein the core is configured with a numerical aperture of at least 0.1 and has the rod fiber portion extending along a length between about 10 cm and about 30 cm, the pump light having a numerical aperture lower than that of the core.

* * * * *